United States Patent [19]
Bernhardt

[11] Patent Number: 5,147,535
[45] Date of Patent: Sep. 15, 1992

[54] ARRANGEMENT FOR DRIVING OUT OF VOLATILE IMPURITIES FROM GROUND WATER USING VIBRATIONS

[75] Inventor: Bruno Bernhardt, Reutlingen, Fed. Rep. of Germany

[73] Assignee: IEG Industrie-Engineering GmbH, Reutlingen, Fed. Rep. of Germany

[21] Appl. No.: 624,324

[22] Filed: Dec. 5, 1990

[30] Foreign Application Priority Data

Dec. 7, 1989 [DE] Fed. Rep. of Germany ....... 3940433

[51] Int. Cl.⁵ .......................................... B01D 17/12
[52] U.S. Cl. ..................................... 210/138; 166/72; 166/177; 210/143; 210/170; 210/219
[58] Field of Search ............... 210/143, 170, 219, 220, 210/703, 747, 748, 902, 138; 166/52, 228, 244.1, 249, 266, 268, 279, 370, 177, 72

[56] References Cited

U.S. PATENT DOCUMENTS 3,981,624 9/1976 Brandon .............................. 166/177
4,679,627 7/1987 Harrison .............................. 166/249
4,950,394 8/1990 Bernhardt et al. .................. 210/170

FOREIGN PATENT DOCUMENTS 3728201 3/1989 Fed. Rep. of Germany ...... 210/748
717292 2/1980 U.S.S.R. .............................. 166/249

Primary Examiner—Robert A. Dawson
Assistant Examiner—Joseph Drodge
Attorney, Agent, or Firm—Michael J. Striker

[57] ABSTRACT

An arrangement for driving out of volatile impurities from ground water and a ground region through which the ground water flows comprises a well shaft extending to a region with contaminated ground water and having at least partially water-permeable shaft walls, a unit for supplying fresh air under a ground water level into the well shaft, and at least one vibration generator which produces mechanical vibrations with a limited energy such that the vibrations cause molecular liquid movements in capillaries of ground layers adjacent the contaminated ground water and do not destroy the capillaries.

6 Claims, 1 Drawing Sheet

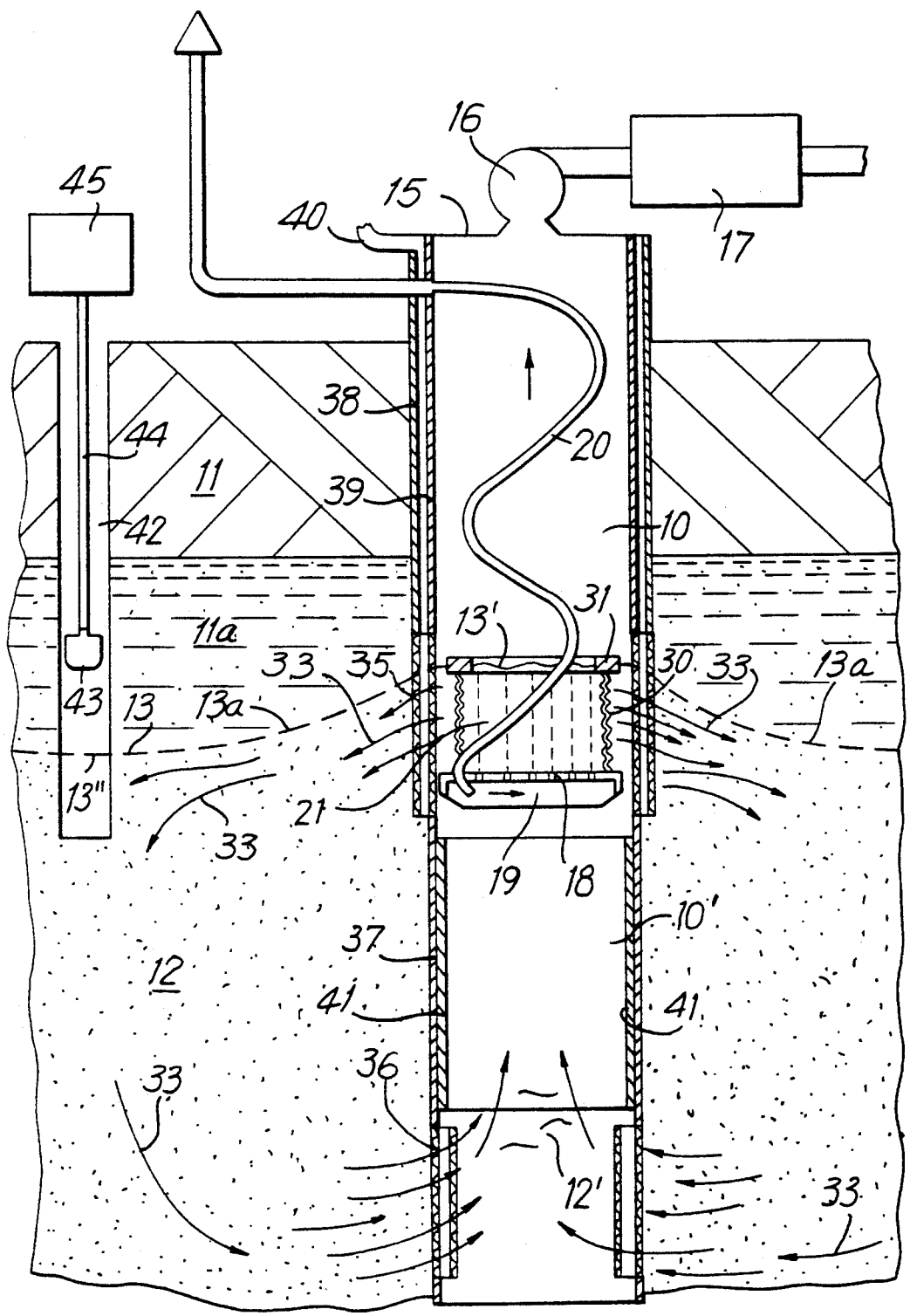

ARRANGEMENT FOR DRIVING OUT OF VOLATILE IMPURITIES FROM GROUND WATER USING VIBRATIONS

BACKGROUND OF THE INVENTION

The present invention relates to an arrangement for driving out of volatile impurities from the ground water and a ground region through which the ground water passes. More particularly, it relates to such an arrangement of the above mentioned type, in which the volatile impurities are driven out by producing of a negative pressure in a well shaft extending in the region of the contaminated ground water and provided with at least partially water-permeable shaft walls and also by supply of fresh air under the ground water level in the well shaft.

Arrangements of the above mentioned general type are known in the art. In one of such arrangements the air is introduced in the well shaft under the action of a negative pressure formed in the water free region of the well shaft, is proposed for example in the German patent 3,805,200. With this arrangement during driving out of volatile impurities from the ground water in gaseous state, significantly higher efficiency is obtained.

SUMMARY OF THE INVENTION

Accordingly, it is an object of the present invention to provide an arrangement for driving out of volatile components from ground water, in which the cleaning efficiency is improved, especially for dense, ground water guiding ground layers.

In keeping with these objects and with others which will become apparent hereinafter, one feature of the present invention resides, briefly stated, in an arrangement for driving out of volatile components from ground water in which at least one vibration generator is arranged in the environment of the well shaft, which delivers with the mechanical vibrations of a limited energy such that the vibrations release molecular liquid movements in the capillaries of the ground layer without destroying the capillaries.

Impurities deposited predominantly in the regions of the ground which are unsaturated with the ground water, in particular in small capillary spaces. These impurities are very hard to remove, especially when the ground layer is very thick. These conventional cleaning arrangements first of all contaminations in porous regions of the ground saturated with ground water are detected. By producing of fine vibrations it is however possible to obtain molecular liquid movements in capillaries and therefore to release the impurities from the capillaries and guide them to the ground water in the shaft. Strong vibrations would lead to caving in of the capillaries and thereby hinders the withdrawal of the contamination substance from the ground region. For adjusting the proper swinging energy, advantageously amplitude and frequency of the vibrations are adjustable. The vibration generator can be arranged in openings around the well shaft, whereby the range of the vibration action of the arrangement can be expanded. It is also however possible to arrange one or several vibration generators directly in the well shaft, when the openings are not possible or are not desirable in the surrounding area of the shaft.

With the arrangement of the vibration generators in separate openings, they can be preferably located above the the ground water level for directly acting on the ground regions which are unsaturated with ground water. Thereby also the cleaning of relatively thick ground layers from molecular contaminating particles is possible. The vibrations can be maintained over a long, adjustable time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE FIGURE

The single FIGURE of the drawings is a view showing a schematic longitudinal section of an arrangement for driving out of volatile components from ground water, in accordance with the present invention.

DESCRIPTION OF THE PREFERRED EMBODIMENTS

An arrangement for driving volatile impurities from ground water has a well shaft which is identified with reference numeral 10. The well shaft 10 extends in a ground region 11 through a contaminated layer 11a which is unsaturated with ground water, to a ground water region 12. The ground water level is shown with a broken line and identified with reference numeral 13.

The well shaft 10 is reinforced with water-impermeable pipes 37 and 38 with the exception of two sieve wall regions 35 and 36. The shaft 10 is closed with a cover 15 above the ground surface. The cover 15 is provided with an opening for a fan 16 which operates for generating a negative pressure in the shaft 10. The air aspirated by the fan 15 from the valve shaft 10 is released to environment through a filter 17. Due to the formation of the negative pressure in the valve shaft, the ground water level 13 in the surrounding area of the shaft 10 and in the shaft 10 is lifted, as shown by a broken line 13a. A cup-shaped sieve plate 18 mounted on a floating ring 31 through chains 30 is arranged under the ground water level 13' in the well shaft 10.

The sieve plate 18 has an inner chamber 19. Fresh air is supplied from outside in the inner chamber 19 through an air conduit 20. The fresh air 10 then rises through the perforations of the sieve plate 18 in small bubbles through the cleaning region 21, before it is again aspirated by the fan 16 from the shaft 10. During rising through the cleaning region 21, the air entrains the volatile impurities of the ground water and guides them through filter 17 into a surrounding atmosphere.

In order to better catch impurities from the region 11a of unsaturated ground water with the cleaning arrangement in the well shaft, an opening 42 is provided at a distance from the well shaft 10. The opening 42 extend to the ground water region 12 in the ground region 11 and extends through the bottom layer 11a which is contaminated and unsaturated with ground water. An electrically driven vibration generator 43 is arranged in the opening 42 above the ground water level 13" in the opening. The vibration generator 43 is connected through a cable 44 with an indicating and control unit 45 arranged above the ground surface. The control unit 45 provides a regulation of the amplitude and/or the frequency of the produced vibrations. More-over, it has a time switching clock for controlling the time of the vibration generation.

The produced vibrations cause molecular liquid movements in the capillaries of the ground region and therefore also a release of volatile impurities which otherwise remain persistently bonded in the capillaries of the ground region 11a of unsaturated ground water. The vibrations are maintained at such an energy level that the capillaries are not destroyed. Released impurities can move partially as gas through the ground water-free ground layer. However, they can also move with the removed liquid in the capillaries into the region 12 saturated with ground water. There it is caught by a stream identified with arrows 33 and caused by the cleaning arrangement in the valve shaft 10 and then supplied through the sieve wall region 36 of the well shaft 10.

The cleaning action of the arrangement can be increased by addition of microorganisms supplied with a nutrient solution through an inlet 40 into the intermediate chamber 39 between both walls of the pipe 38. From there, the microorganisms sink in the sieve wall region 35, where they are transferred by ground water to the surrounding ground region. The growth of the microorganisms can be accelerated ten times by heating elements 41 in the well shaft 10.

In deviation from the above shown embodiment of the inventive arrangement, additionally further openings of the same or different depths can be provided with one or several vibration generators in the surrounding area of the valve shaft, and also the vibration generator can be arranged in the valve shaft itself. Thereby the range and the efficiency of the cleaning arrangement can also be increased in contaminated thicker bottom layers.

It will be understood that each of the elements described above, or two or more together, may also find a useful application in other types of constructions differing from the types described above.

While the invention has been illustrated and described as embodied in an arrangement for driving out of volatile impurities from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for driving out of volatile impurities from ground water and ground region through which the ground water flows, comprising a well shaft arranged to extend from a ground surface to a ground region which contains contaminated ground water, said well shaft having at least partially water-permeable shaft walls; means for supplying fresh air into said well shaft; means comprising at least one vibration generator generating mechanical vibrations in ground layers adjacent to the ground water with a limited energy such that the vibrations cause molecular liquid movements in capillaries in the ground layers adjacent to the ground water and do not destroy the capillaries; and at least one opening extending near said well shaft through the ground layers adjacent to the ground water, said at least one vibration generator being respectfully arranged in said at least one opening.

2. An arrangement as defined in claim 1; wherein said at least one opening comprises a plurality of openings extending near said well shaft in the ground layers adjacent to the ground water, each of said openings being provided with one of said at least one vibration generator.

3. An arrangement as defined in claim 2, wherein said vibration generators are arranged in said openings above a ground water level of the contaminated ground water.

4. An arrangement as defined in claim 1, wherein said at least one vibration generator is arranged in said opening above a ground water level of the contaminated ground water.

5. An arrangement as defined in claim 1, wherein said vibration generator is adapted to generate vibrations with regulatable amplitude and frequency.

6. An arrangement as defined in claim 1, wherein said vibration generator is adapted to generate vibrations during an adjustable operation time.

* * * * *